United States Patent
Kremers et al.

(10) Patent No.: US 10,678,050 B2
(45) Date of Patent: Jun. 9, 2020

(54) PROJECTION ARRANGEMENT FOR A CONTACT ANALOG HEAD-UP DISPLAY (HUD)

(71) Applicant: SAINT-GOBAIN GLASS FRANCE, Courbevoie (FR)

(72) Inventors: Stephan Kremers, Heinsberg (DE); Martin Arndt, Aachen (DE); Stefan Gossen, Aachen (DE)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 184 days.

(21) Appl. No.: 15/578,213

(22) PCT Filed: Jun. 10, 2016

(86) PCT No.: PCT/EP2016/063406
§ 371 (c)(1),
(2) Date: Nov. 29, 2017

(87) PCT Pub. No.: WO2016/198678
PCT Pub. Date: Dec. 15, 2016

(65) Prior Publication Data
US 2018/0149867 A1    May 31, 2018

(30) Foreign Application Priority Data

Jun. 11, 2015  (EP) .................................... 15171628

(51) Int. Cl.
*G02B 27/01*  (2006.01)
*B32B 17/10*  (2006.01)

(52) U.S. Cl.
CPC .... *G02B 27/0103* (2013.01); *B32B 17/10036* (2013.01); *B32B 17/10137* (2013.01);
(Continued)

(58) Field of Classification Search
CPC .... G02B 27/00; G02B 27/01; G02B 27/0101; G02B 27/0118; G02B 27/012; G02B 27/0121; G02B 27/013
(Continued)

(56) References Cited

U.S. PATENT DOCUMENTS 5,013,134 A    5/1991    Smith
5,130,174 A    7/1992    Esposito
(Continued)

FOREIGN PATENT DOCUMENTS

DE    102007059323 A1    6/2009
DE    102008008758 A1    8/2009
(Continued)

OTHER PUBLICATIONS

International Search Report for International Application No. PCT/EP2016/063406 filed Jun. 10, 2016 on behalf of Saint-Gobain Glass France, dated Sep. 21, 2016. 7 pages. (German + English Translation).

(Continued)

*Primary Examiner* — Robert E. Tallman
(74) *Attorney, Agent, or Firm* — Pillsbury Winthrop Shaw Pittman LLP

(57) ABSTRACT

A projection arrangement for a head-up display (HUD) is presented. The arrangement has a vehicle windshield that includes an outer pane and an inner pane bonded to one another via a thermoplastic intermediate layer. The vehicle windshield has an upper edge, a lower edge, and an HUD region. The thickness of the thermoplastic intermediate layer in the vertical course between the upper edge and the lower edge varies, at least in the HUD region, according to a wedge angle. The arrangement also has a projector that is aimed at the HUD region to generate a virtual image at a projection distance of at least 5 m. According to one aspect, (Continued)

Figure 1:
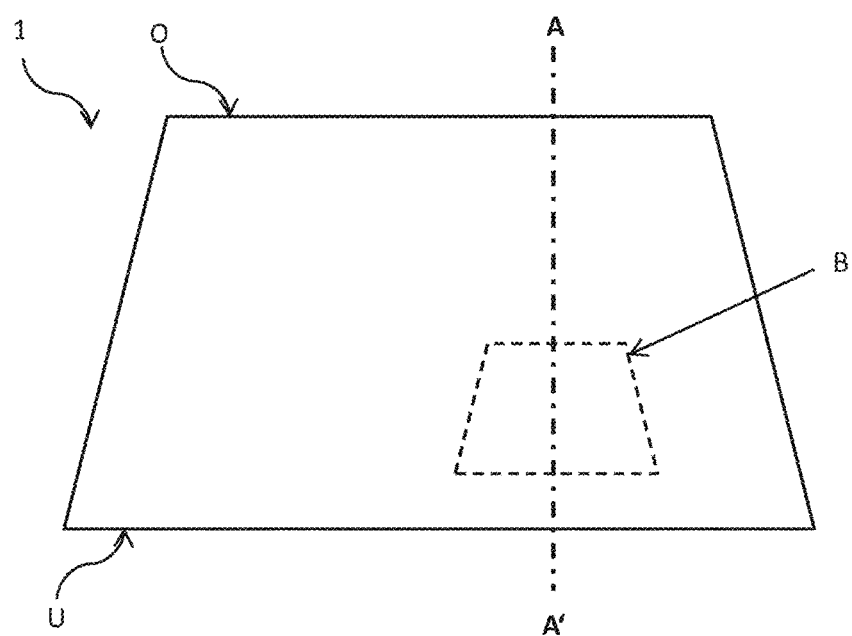

a vertical radius of curvature in the HUD region is at least 6 m and a maximum value of the wedge angle is less than or equal to 0.3 mrad.

19 Claims, 3 Drawing Sheets

(52) U.S. Cl.
CPC .... *B32B 17/10568* (2013.01); *G02B 27/0101* (2013.01); *G02B 2027/0109* (2013.01); *G02B 2027/0121* (2013.01); *G02B 2027/0194* (2013.01); *G02B 2027/0196* (2013.01)

(58) Field of Classification Search
USPC ................ 359/443, 451, 618, 629, 630, 631
See application file for complete search history.

(56) References Cited

U.S. PATENT DOCUMENTS

| | | | |
|---|---|---|---|
| 5,504,622 | A | 4/1996 | Oikawa et al. |
| 5,812,332 | A | 9/1998 | Freeman |
| 5,945,199 | A | 8/1999 | Morin et al. |
| 8,075,983 | B2 | 12/2011 | Masaki et al. |
| 8,764,923 | B2 | 7/2014 | Durbin et al. |
| 9,067,386 | B2 | 6/2015 | Miyai |
| 9,915,822 | B2 | 3/2018 | Arndt et al. |
| 10,234,681 | B2 | 3/2019 | Arndt et al. |
| 10,350,859 | B2 | 7/2019 | Arndt et al. |
| 2002/0086141 | A1* | 7/2002 | Sauer ...................... B32B 17/10 428/156 |
| 2004/0109251 | A1 | 6/2004 | Freeman et al. |
| 2004/0166288 | A1 | 8/2004 | Travis et al. |
| 2005/0142332 | A1 | 6/2005 | Sauer |
| 2006/0210776 | A1 | 9/2006 | Lu et al. |
| 2007/0009714 | A1 | 1/2007 | Lee et al. |
| 2007/0020465 | A1 | 1/2007 | Thiel et al. |
| 2007/0082219 | A1 | 4/2007 | Fleury et al. |
| 2007/0148472 | A1 | 6/2007 | Masaki et al. |
| 2008/0176043 | A1* | 7/2008 | Masaki ............. B32B 17/10036 428/172 |
| 2009/0294212 | A1 | 12/2009 | Miyai |
| 2010/0314900 | A1* | 12/2010 | Labrot .............. B32B 17/10036 296/90 |
| 2011/0189426 | A1 | 8/2011 | Durbin et al. |
| 2012/0025559 | A1 | 2/2012 | Offermann et al. |
| 2012/0094084 | A1 | 4/2012 | Fisher et al. |
| 2013/0149503 | A1 | 6/2013 | Yamamoto et al. |
| 2013/0188260 | A1 | 7/2013 | Matsushita et al. |
| 2013/0249942 | A1 | 9/2013 | Green et al. |
| 2013/0316158 | A1 | 11/2013 | Rehfeld et al. |
| 2014/0011000 | A1 | 1/2014 | Dunkmann et al. |
| 2014/0319116 | A1 | 10/2014 | Fischer et al. |
| 2014/0354692 | A1 | 12/2014 | Ng-Thow-Hing et al. |
| 2014/0362434 | A1 | 12/2014 | Schmitz et al. |
| 2014/0375816 | A1 | 12/2014 | Maihoefer |
| 2016/0291324 | A1 | 10/2016 | Arndt et al. |
| 2016/0320616 | A1* | 11/2016 | Ichii ................... G02B 27/0179 |
| 2017/0003503 | A1 | 1/2017 | Arndt et al. |
| 2017/0274630 | A1* | 9/2017 | Oota ...................... B32B 27/18 |
| 2017/0313032 | A1 | 11/2017 | Arndt et al. |
| 2018/0149865 | A1 | 5/2018 | Arndt et al. |
| 2018/0157033 | A1 | 6/2018 | Arndt et al. |
| 2018/0297331 | A1* | 10/2018 | Gahagan ........... B32B 17/10036 |

FOREIGN PATENT DOCUMENTS

| | | | |
|---|---|---|---|
| DE | 102013012648 | A1 | 3/2014 |
| DE | 102014001710 | A1 | 8/2014 |
| DE | 102014005977 | A1 | 9/2014 |
| EP | 1800855 | A1 | 6/2007 |
| EP | 1880243 | A2 | 1/2008 |
| EP | 1800855 | B1 | 2/2013 |
| FR | 2680584 | A1 | 2/1993 |
| JP | H03209210 | A | 9/1991 |
| JP | 2004536009 | A | 12/2004 |
| JP | 2008201667 | A | 9/2008 |
| JP | 2009035444 | A | 2/2009 |
| JP | 2011207645 | A | 10/2011 |
| JP | 2013001613 | A | 1/2013 |
| JP | 2017502124 | A | 1/2017 |
| KR | 0135743 | B1 | 4/1998 |
| KR | 20100094987 | A | 8/2010 |
| WO | 03/024155 | A2 | 3/2003 |
| WO | 2006122305 | A2 | 11/2006 |
| WO | 2009/071135 | A1 | 6/2009 |
| WO | 2010/121986 | A1 | 10/2010 |
| WO | 2012/029916 | A1 | 3/2012 |
| WO | 2012/073030 | A1 | 6/2012 |
| WO | 2013/104438 | A1 | 7/2013 |
| WO | 2013/104439 | A1 | 7/2013 |
| WO | 2013136374 | A1 | 9/2013 |
| WO | 2014079567 | A1 | 5/2014 |
| WO | 2015/086233 | A1 | 6/2015 |
| WO | 2015/086234 | A1 | 6/2015 |
| WO | 2015/134836 | A1 | 9/2015 |
| WO | 2016/091435 | A1 | 6/2016 |
| WO | 2016/198678 | A1 | 12/2016 |
| WO | 2016/198679 | A1 | 12/2016 |
| WO | 2017/157660 | A1 | 9/2017 |

OTHER PUBLICATIONS

International Search Report for International Application No. PCT/EP2016/063407 filed Jun. 10, 2016 on behalf of Saint-Gobain Glass France, dated Sep. 21, 2016. 7 pages. (German + English Translation).
Written Opinion for International Application No. PCT/EP2016/063406 filed Jun. 10, 2016 on behalf of Saint-Gobain Glass France, dated Sep. 21, 2016. 13 pages. (English translation + German).
Written Opinion for International Application No. PCT/EP2016/063407 filed Jun. 10, 2016 on behalf of Saint-Gobain Glass France, dated Sep. 21, 2016. 13 pages. (English translation + German).
Aclocque, J.P., "Double Vision as a Disturbing Optical Failure of the Windshield," Z. Glastechn. Ber., May 1970, vol. 43(5), 16 pages, (English translation + German original).
Final Office Action for U.S. Appl. No. 15/039,794, filed May 26, 2016, on behalf of Saint-Gobain Glass France, dated Dec. 12, 2018. 31 pages.
International Search Report for Application No. PCT/EP2014/074115 filed Nov. 10, 2014 on behalf of Saint Gobain Glass France, dated Jan. 21, 2015, 5 pages (English Translation + German Original).
International Search Report for Application No. PCT/EP2014/074116 filed Nov. 10, 2014 on behalf of Saint-Gobain Glass France, dated Jan. 21, 2015. 5 pages. (English Translation + German Original).
International Search Report for Application No. PCT/EP2015/073625 filed Oct. 13, 2015 on behalf of Saint-Gobain Glass France, dated Dec. 9, 2015. 7 pages (German Original+ English Translation).
International Search Report for Application No. PCT/EP2017/054735 filed Mar. 1, 2017 on behalf of Saint-Gobain Glass France, dated May 24, 2017, 9 pages (English Translation+ German Original).
Non-Final Office Action for U.S. Appl. No. 15/038,321, filed May 20, 2016 on behalf of Saint-Gobain Glass France, dated May 9, 2017, 13 pages.
Non-Final Office Action for U.S. Appl. No. 15/039,794, filed May 26, 2016 on behalf of Saint-Gobain Glass France, dated Feb. 22, 2018. 27 pages.
Non-Final Office Action for U.S. Appl. No. 15/881,576, filed Jan. 26, 2018 on behalf of Saint-Gobain Glass France, dated Mar. 28, 2018. 6 pages.
Non-Final Office Action for U.S. Appl. No. 15/531,718, filed May 30, 2017 on behalf of Saint-Gobain Glass France, dated Jul. 23, 2018. 9 pages.

(56) References Cited

OTHER PUBLICATIONS

Notice of Allowance for U.S. Appl. No. 15/038,321, filed May 20, 2016 on behalf of Saint-Gobain Glass France, dated Aug. 28, 2017, 9 pages.
Notice of Allowance for U.S. Appl. No. 15/038,321, filed May 20, 2016 on behalf of Saint-Gobain Glass France, dated Nov. 9, 2017, 7 pages.
Notice of Allowance for U.S. Appl. No. 15/531,718, filed May 30, 2017, on behalf of Saint-Gobain Glass France, dated Jan. 10, 2019. 11 pages.
Notice of Allowance for U.S. Appl. No. 15/881,576, filed Jan. 26, 2018, on behalf of Saint-Gobain Glass France, dated Nov. 6, 2018. 9 pages.
Notice of Allowance for U.S. Appl. No. 15/881,576, filed Jan. 26, 2018 on behalf of Saint-Gobain Glass France, dated Sep. 12, 2018. 9 pages.
Restriction Requirement for U.S. Appl. No. 15/531,718, filed May 30, 2017 on behalf of Saint-Gobain Glass France, dated May 21, 2018. 8 pages.
Written Opinion for Application No. PCT/EP2014/074115 filed Nov. 10, 2014 on behalf of Saint-Gobain Glass France, dated Jan. 21, 2015. 14 pages (English Translation + German Original).
Written Opinion for Application No. PCT/EP2014/074116 filed Nov. 10, 2014 on behalf of Saint-Gobain Glass France, dated Jan. 21, 2015, 17 pages (English Translation + German Original).
Written Opinion for Application No. PCT/EP2015/073625 filed Oct. 13, 2015 on behalf of Saint-Gobain Glass France, dated Dec. 9, 2015. 11 pages (German Original+ English Translation).
Written Opinion of International Application No. PCT/EP2017/054735 filed Mar. 1, 2017 on behalf of Saint-Gobain Glass France, dated May 24, 2017. 12 pages. (German original + English translation).

\* cited by examiner

PROJECTION ARRANGEMENT FOR A CONTACT ANALOG HEAD-UP DISPLAY (HUD)

CROSS REFERENCE TO RELATED APPLICATIONS

The present application is the U.S. national stage entry of International Patent Application No. PCT/EP2016/063406, filed internationally on Jun. 10, 2016, which, in turn, claims priority to European Patent Application No. 15171628.9, filed on Jun. 11, 2015.

The invention relates to a projection arrangement for a head-up display (HUD), a method for its production as well as the use of a windshield in such a projection arrangement.

Modern automobiles are increasingly equipped with so called head-up displays (HUDs). With a projector, for example, in the region of the dashboard or in the roof region, images are projected onto the windshield, reflected there, and perceived by the driver as a virtual image (from his point of view) behind the windshield. Thus, important data can be projected into the driver's field of vision, for example, the current driving speed, navigation or warning messages, which the driver can perceive without having to divert his glance from the road. Head-up displays can thus contribute significantly to an increase in traffic safety. The projection distance (distance between a virtual image and the driver) of a conventional HUD for displaying static data is typically approx. 2 m.

A more recent variant of the HUD is referred to as a contact analog HUD or an augmented reality HUD. These HUDs are distinguished by a larger HUD region (projection area on the pane) and a significantly greater projection distance of at least 5 m, typically even more than 7 m. Contact analog HUDs open up the possibility of no longer projecting only readable data statically on the pane, but, instead, of using the optical information for identification of elements of the actual environment of the vehicle—exemplary applications are the optical marking of road boundaries, the optical highlighting of pedestrians on the road side, navigational instructions directly on the road, or the marking of vehicles that have been recognized by the driver assistance system. The greater projection distance is produced by a greater optical path length of the beams inside the projector, for instance, by additional mirrors and a greater volume. Contact analog HUDs are, for example, known from DE102014001710A1, WO2014079567A1, US2013249942A1, US2014354692A1, US2014375816A1, and WO2013136374A1.

With HUDs, the basic problem arises that the projector image is reflected on both surfaces of the windshield. Thus, the driver perceives not only the desired primary image but also a slightly offset secondary image, usually weaker in intensity. The latter is commonly referred to as a ghost image. This problem is generally resolved in that the reflecting surfaces are arranged at an angle relative to one another deliberately selected such that the primary image and the ghost image coincide, as a result of which the ghost image is no longer distractingly noticeable. In prior art composite glasses for head-up displays, the wedge angle is typically approx. 0.5 mrad.

Windshields comprise two glass panes that are laminated to one another via a thermoplastic film. If the surfaces of the glass panes are to be arranged at an angle as described, it is customary to use a thermoplastic film with a non-constant thickness. This is also referred to as a wedge-shaped film or a wedge film. The angle between the two surfaces of the film is referred to as a wedge angle. The wedge angle can be constant over the entire film (linear change in thickness) or can change depending on position (nonlinear change in thickness). Composite glasses with wedge films are known, for example, from WO2009/071135A1, EP1800855B1, or EP1880243A2.

Wedge films are typically produced by extrusion, wherein a wedge-shaped extrusion die is used. The production of a wedge film with a desired wedge angle, which depends, among other things, on the concrete pane geometry and the projection arrangement of the head-up display, is very expensive and complex.

The object of the invention is to provide a projection arrangement for a head-up display (HUD) with an improved windshield that is more economical and simpler to produce and by means of which the problems of ghost images are effectively minimized.

This object is accomplished according to the invention by a projection arrangement in accordance with the independent claims. Preferred embodiments emerge from the subclaims.

The projection arrangement for a head-up display (HUD) according to the invention comprises at least a vehicle windshield (in particular of a motor vehicle, for example, of an automobile) and a projector. As customary with HUDs, the projector irradiates a region of the windshield, where the radiation is reflected in the direction of the observer (driver), by which means a virtual image is generated, which the observer situated in the vehicle perceives from his viewpoint as behind the windshield. The region of the windshield which can be irradiated by the projector is referred to as the HUD region. The projector is aimed at the HUD region. The direction of irradiation of the projector can typically be varied by mirrors, in particular vertically, in order to adapt the projection to the body size of the observer. The region in which the eyes of the observer must be situated with a given mirror position is referred to as the eyebox window. This eyebox window can be shifted vertically by adjustment of the mirrors, with the entire area thus available (i.e., the overlay of all possible eyebox windows) referred to as eyebox. An observer situated within the eyebox can perceive the virtual image. This, of course, means that the eyes of the observer must be situated within the eyebox not, for example, the entire body. The beam that runs between the projector and the center of the eyebox is commonly referred to as the central beam. It is a characteristic reference beam for the design of an HUD projection arrangement.

The technical terms from the field of HUDs used here are generally known to the person skilled in the art. For a detailed presentation, reference is made to the dissertation "Simulation-Based Metrology for Testing Head-Up Displays" by Alexander Neumann at the Informatics Institute of Munich Technical University (Munich: University Library of Munich TU, 2012), in particular to chapter 2 "The Head-Up Display".

The windshield comprises an outer pane and an inner pane, which are bonded to one another via a thermoplastic intermediate layer. The windshield is intended, in a window opening of a vehicle, to separate the interior from the outside environment. In the context of the invention, "inner pane" refers to the pane facing the interior (vehicle interior). "Outer pane" refers to the pane facing the outside environment.

The thickness of the intermediate layer is variable, at least in sections, in the vertical course between the upper edge and the lower edge of the windshield. Here, "in sections" means that the vertical course between the upper edge and the lower edge has at least one section in which the thickness of the intermediate layer varies depending on position, i.e., the intermediate layer has a wedge angle. The thickness of the intermediate layer is variable at least in the HUD region. However, the thickness can also vary in a plurality of sections or in the entire vertical course, for example, can increase substantially continuously from the lower edge to the upper edge. The term "vertical course" refers to the course between the upper edge and the lower edge with the direction of the course being substantially perpendicular to the upper edge. Since, in windshields, the upper edge can deviate greatly from a straight line, the vertical course in the context of the invention is more precisely expressed as perpendicular to a (straight) connecting line between the corners of the upper edge. The intermediate layer has, at least in sections, a finite wedge angle, i.e., a wedge angle greater than 0°, namely, in the section in which the thickness is variable. The term "wedge angle" refers to the angle between the two surfaces of the intermediate layer. If the wedge angle is not constant, the tangents to its surface must be used for its measurement at a point.

The head-up display according to the invention is a so-called "contact analog HUD" or "augmented reality HUD". In a contact analog HUD, not only is information protected on a limited region of the windshield, but elements of the outside environment are included in the representation. Examples of this are the marking of a pedestrian, indication of the distance to a preceding vehicle, or the projection of navigation data directly on the roadway, for example, for marking the traffic lane to be selected. The contact analog HUD is distinguished from a conventional, static HUD in that the projection distance is at least 5 m. In a static HUD, the projection distance is significantly smaller, typically approx. 2 m. In the context of the invention, the projection distance refers to the distance between the virtual image and the observer, i.e., as a rule, the driver's head. The projection distance is preferably at least 7 m. The projection distance is preferably at most 15 m.

In a projection arrangement of a contact analog HUD, the projection distance for all projected images is substantially constant. Even projections that the driver is supposed to perceive subjectively at a different distance have, in reality, substantially the same projection distance. The subjective impression of a different distance is obtained by geometric optical effects.

The distance between the windshield and the virtual image is customarily referred to as "image width". Since, typically, the driver's head has a distance of roughly 1 m from the windshield, the image width is approx. 1 m less than the projection distance. Consequently, as an alternative to projection distance, image width can be used as a criterion with sufficient accuracy. Accordingly, the image width is preferably at least 4 m, particularly preferably at least 6 m, and preferably at most 14 m.

The maximum wedge angle is less than or equal to 0.3 mrad. This is significantly less than the typical wedge angle in prior art static HUDs (approx. 0.5 mrad). The term "maximum wedge angle" refers to the largest wedge angle that appears in the intermediate layer, with possible extreme values on the edges being negligible.

The windshield according to the invention has, in the HUD region, a vertical radius of curvature of at least 6 m. In other words, in the HUD region, only vertical radii of curvature that are greater than or equal to 6 m occur. The vertical radius of curvature is based here on the curvature in the vertical dimension of the pane between the upper edge and the lower edge. "Vertical" means perpendicular to the upper edge in the direction of the lower edge, wherein the upper edge, when it deviates from a straight line, is imagined as a straight connecting line between the corners of the upper edge. Large radii of curvature correspond to a slight curvature; small radii of curvature, to a strong curvature of the pane.

The invention is based on the surprising finding that the enlarged projection distance of the contact analog HUD compared to the static HUD in conjunction with a not too strong curvature of the pane in the HUD region ensures that, with a small wedge angle, the primary image and the ghost image are effectively superimposed. At projection distances starting at 5 m and radii of curvature of at least 6 m, wedge angles of only 0.3 mrad at most are required. The invention thus enables the use of thermoplastic films with only small wedge angles, which are more economical and simpler to produce than films with larger wedge angles. Such films can be obtained, in fact, by stretching a film of constant thickness instead of by extrusion.

As a result of refraction and reflection on the various surfaces of the composite glass, double images—objects that are observed through the composite glass appear double— can arise in transmission. This effect can even be amplified by the wedge films with large wedge angles optimized for HUD. The invention enables the use of very small wedge angles as a result of which the problem of double images in transmission is reduced. This is another important advantage of the invention.

In addition to the projection distance and the pane curvature, other factors have an influence on the necessary wedge angle, including pane thickness as well as the installation angle of the windshield. With suitable design of the HUD, even significantly smaller wedge angles can be adequate. In a preferred embodiment, the maximum wedge angle is less than or equal to 0.2 mrad, particularly preferably less than or equal to 0.15 mrad, most particularly preferably less than or equal to 0.1 mrad. The smaller the wedge angle, the simpler the intermediate layer is to produce, and the less pronounced the problems of the double images in transmission.

The vertical radius of curvature in the HUD region is preferably from 6 m to 10 m. This means that only vertical radii of curvature of 6 m to 10 m occur in the HUD region. Thus, good results are obtained without having to implement the pane too flat in the HUD region, which is usually undesirable, for example, for reasons of aesthetics or aerodynamics.

In a preferred embodiment, the vertical radius of curvature in the HUD region is at least 7 m, preferably from 7 m to 9 m, particularly preferably from 7 m to 8 m. Thus, particularly good results are obtained.

The vertical radii of curvature of the entire windshield are preferably in the range from 1 m to 20 m, particularly preferably 2 m to 15 m, in particular 3 m to 13 m.

The wedge angle can be constant in the vertical course, which results in a linear change in thickness of the intermediate layer, with the thickness typically and preferably becoming greater from the bottom to the top. The direction indication "from the bottom to the top" refers to the direction from the lower edge to the upper edge. However, more complex thickness profiles can be present, in which the wedge angle is linearly or non-linearly variable from the bottom to the top (in other words, position dependent in the vertical course).

The thickness of the intermediate layer can be constant in horizontal sections (in other words, sections roughly parallel to the upper edge and the lower edge). In that case, the thickness profile is constant over the width of the composite glass. The thickness can, however, also be variable in horizontal sections. In that case, the thickness is variable not only in the vertical course but also in the horizontal course.

The intermediate layer is formed by at least one thermoplastic film. In an advantageous embodiment, the wedge angle is produced in the film by stretching. The wedge-shaped film is not extruded, but is originally provided as conventional film with substantially constant thickness and reshaped by stretching such that it has the desired wedge angle. This is simpler and more economical than production by extrusion. The person skilled in the art subsequently recognizes whether a wedge angle is formed by stretching or by extrusion, in particular from the typical course of thickness in the vicinity of the lower edge and/or the upper edge.

The HUD region is, in the case of a contact analog HUD, typically larger than in the case of a conventional static HUD. In a preferred embodiment, the area of the HUD region according to the invention is at least 7% of the area of the windshield, particularly preferably at least 8%. The area of the HUD region of a static HUD is typically at most 4-5% of the area of the windshield. For example, the area of the HUD region is from 40,000 $mm^2$ to 125,000 $mm^2$.

The installation angle of the windshield is typically in the range from 55° to 75° relative to the horizontal, in particular from 58° to 72°. With these installation angles, the wedge angles according to the invention can be realized with no problem. In a particularly advantageous embodiment, the installation angle is from 60° to 68° relative to the horizontal, preferably 63° to 67°. Thus, particularly small wedge angles of the intermediate layer can be obtained.

The angle of incidence of the central beam on the windshield is preferably in the range from 50° to 75°, particularly preferably in the range from 60° to 70° and is, for example, 65°. The angle of incidence is measured relative to the direction of the perpendicular on the windshield.

The thicknesses of the outer pane and of the inner pane can, in principle, be freely selected in the context of the values customary in the art. For conventional windshields, thicknesses of the individual panes are customarily in the range of 1 mm to 5 mm, in particular 1.2 mm to 3 mm. Thus, the wedge angles according to the invention can be realized without problems. Advantageously, the individual panes have, in each case, a thickness that is a maximum of 5 mm, preferably a maximum of 3 mm. Standard pane thicknesses are, for example, 2.1 mm or 1.6 mm. Preferred thicknesses for the outer pane and the inner pane are in the range from 1.2 mm to 2.6 mm, particularly preferably from 1.4 mm to 2.1 mm. The thickness of the outer pane and of the inner pane are, in a preferred embodiment, at most 2.6 mm, particularly preferably at most 2.1 mm, since, thus, advantageously, small wedge angles are required.

In another preferred embodiment, at least one of the Individual panes of the windshield is less thick. In addition to the weight savings, this has the advantage that an even smaller wedge angle is required for compensation of the ghost image since the reflecting surfaces are positioned closer together. By this means, the primary image and the ghost image are less greatly offset relative to one another such that they can be made to coincide with a smaller wedge angle.

Preferably, the inner pane has a thickness of less than 1.2 mm. The outer pane is preferably thicker than the inner pane, as a result of which, despite the lower material thickness, adequate stability of the windshield is obtained. The thickness of the inner pane is particularly preferably from 0.3 mm to 1.1 mm, most particularly preferably from 0.5 mm to 0.9 mm, and in particular from 0.6 mm to 0.8 mm.

The outer pane can have a thickness in the conventional range for composite glasses, in particular in the range from 2.1 mm to 3.0 mm, for example, 2.1 mm or 2.6 mm. In a particularly advantageous embodiment, the outer pane is also a thinner pane and has a thickness of less than 2.1 mm. Thus, the above mentioned advantages are amplified.

The thickness of the outer pane is preferably from 1.2 mm to 2.0 mm, particularly preferably from 1.4 mm to 1.8 mm, most particularly preferably from 1.5 mm to 1.7 mm. with these thicknesses, the composite glasses are adequately stable to be used as motor vehicle glazing. An asymmetric combination of a thicker outer pane and a thinner inner pane has proved its worth in increasing stone impact resistance and fracture resistance.

The outer pane and the inner pane can be non-tempered panes. Alternatively, however, the thin inner pane can be a chemically tempered pane. In chemical tempering, the chemical composition of the glass is altered in the region of the surface by ion exchange. In particular, the thicker outer pane is a non-tempered pane and the thinner inner pane is a chemically tempered pane.

The inner pane and the outer pane are preferably made of glass, particularly preferably of soda lime glass, which has proved itself for window glass. However, the panes can also be made from other types of glass, for example, borosilicate or aluminosilicate glass. Alternatively, the panes can, in principle, be made of plastic, in particular polycarbonate or PMMA.

The outer pane preferably contains soda lime glass; the inner pane, soda lime glass or aluminosilicate glass. Particularly preferably, the outer pane is made of non-tempered soda lime glass and the inner pane either likewise of non-tempered soda lime glass or of chemically tempered aluminosilicate glass. Aluminosilicate can be chemically tempered more effectively than soda lime glass.

The outer pane, the inner pane, and the thermoplastic intermediate layer can be clear and colorless, but also tinted or colored. In a preferred embodiment, the total transmittance through the composite glass is greater than 70%, in particular when the composite glass is a windshield.

The term "total transmittance" is based on the process for testing the light permeability of motor vehicle windows specified by ECE-R 43, Annex 3, § 9.1.

In addition to the vertical curvature, the windshield is also distinguished by horizontal curvature. However, this has a minor influence on the ghost image problem and is, consequently, not fundamental to the invention. It can be selected as is customary in the art. The windshield can, in principle, also be flat (in other words, can have an infinite vertical and horizontal radius of curvature), for example, when it is provided as a pane for buses, trains, or tractors.

The intermediate layer preferably has a minimum thickness from 0.2 mm to 2 mm, particularly preferably from 0.3 mm to 1 mm, most particularly preferably from 0.5 mm to 0.9 mm. "Minimum thickness" refers to the thickness at the thinnest point of the intermediate layer. Composite glasses with thinner intermediate layers frequently have excessively low stability to be able to be used as vehicle panes. Thermoplastic films, in particular PVB films are sold in the standard thickness 0.76 mm. Wedge angles according to the invention can be introduced advantageously from these films by stretching. Since the wedge angles according to the invention are very small, the film is not thinned locally so greatly that problems with the stability of the composite glass arise.

The intermediate layer preferably contains at least polyvinyl butyral (PVB), ethylene vinyl acetate (EVA), polyurethane (PU), or mixtures or copolymers or derivatives thereof, particularly preferably PVB. In a preferred embodiment, the intermediate layer is formed from a PVB film.

The intermediate layer can be implemented by a single film or even by more than one film. In the latter case, at least one of the films must be implemented with the wedge angle. The intermediate layer can also be implemented as a so-called "acoustic film", which has a noise-damping effect. Such films typically consist of at least three layers, with the middle layer having higher plasticity or elasticity than the outer layers surrounding it, for example, as a result of a higher plasticizer content. The use of such a noise-damping, multilayer film serves preferably to improve the acoustic comfort. This is advantageous, in particular, when the outer and/or inner pane is implemented with low thickness and as a result can shield against noises less well.

The windshield according to the invention can have a functional coating, for example, an IR reflecting or absorbing coating, a UV reflecting or absorbing coating, a chromophoric coating, a low emissivity coating, a heatable coating, a coating with an antenna function, and anti-splinter coating, or an electromagnetic radiation shielding coating. The functional coating can be arranged on one surface of the outer pane or on the inner pane, or even on an insertion film in the intermediate layer, made, for example, of polyethylene terephthalate (PET).

The invention includes, moreover, a method for producing a projection arrangement for an HUD, which is implemented in particular as described above, wherein the projection arrangement comprises:
  a motor vehicle windshield, including an outer pane and an inner pane, which are bonded to one another via a thermoplastic intermediate layer, with an upper edge and a lower edge and an HUD region, wherein the thickness of the thermoplastic intermediate layer in the vertical course between the upper edge and the lower edge is variable at least in the HUD region with a wedge angle less than or equal to 0.3 mrad; and
  a projector, which is aimed at the HUD region and generates a virtual image with a projection distance of at least 5 m.

The method according to the invention comprises at least the following process steps:
(a) Calculating the HUD region of the windshield;
(b) Creating a profile of the vertical radius of curvature, wherein the vertical radius of curvature in the HUD region is at least 6 m;
(c) Producing the windshield with the wedge angle and the calculated vertical radius of curvature;
(d) Relative arrangement of the windshield and projector, wherein the projection arrangement is created.

The particular advantage of the method resides in the fact that the curvature profile of the windshield is included in the design of the projection arrangement. The preferred embodiments described above with reference to the composite glass apply mutatis mutandis to the method according to the invention.

The thicknesses of the panes as well as the installation position are typically already defined in the design of the HUD. On this basis, a wedge angle can also be determined theoretically such that ghost images are optimally minimalized. The calculation of the wedge angle course is done by means of simulations customary in the art. Also, the relative arrangement between the windshield and the projector must be established. Since the curvature profile can also influence the ghost image, adaptation of the wedge angle can be necessary at this time. The final determination of the pane geometry with the wedge angle and the curvature profile can be done iteratively until the ghost problem is minimized. The steps described thus far typically occur in the design phase, typically using the CAD data of the vehicle. After the final pane geometry has been established, the pane can be produced.

The thermoplastic intermediate layer is provided as at least one film. In a preferred embodiment, this is a conventional thermoplastic film, in particular PVB film, having (in the initial state) substantially constant thickness. The variable thickness with the wedge angle according to the invention is preferably introduced by stretching the film, in other words, the action of mechanical force through appropriate pulling. The small wedge angles according to the invention can be obtained by stretching, which is significantly more economical than production of the wedge film by extrusion. Alternatively, the thermoplastic intermediate layer can also be produced by extrusion using a wedge-shaped extrusion die.

Before lamination, the outer pane and the inner pane are preferably subjected to a bending process corresponding to the calculated curvature profile. Preferably, the outer pane and the inner pane are bent congruently together (i.e., at the same time and by the same tool), since, thus, the shape of the panes is optimally matched for the subsequently occurring lamination. Typical temperatures for glass bending processes are, for example, 500° C. to 700° C.

If the inner pane is to be provided with chemical tempering, the pane is advantageously cooled slowly after bending, preferably until cooling to a temperature of 400° C. with a cooling rate of 0.05° C./sec to 0.5° C./sec, to prevent thermal stresses. It can be further cooled thereafter, even with higher cooling rates, since below 400° C. the risk of generating thermal stresses is low. The chemical tempering is preferably done at a temperature from 300° C. to 600° C., particularly preferably from 400° C. to 500° C. The pane is treated with a salt melt, for example, immersed in the salt melt. During the treatment, in particular sodium ions of the glass are replaced by larger ions, in particular larger alkali ions, creating the desired surface compressive stresses. The salt melt is preferably the melt of a potassium salt, particularly preferably potassium nitrate ($KNO_3$) or potassium sulfate ($KSO_4$), most particularly preferably potassium nitrate ($KNO_3$). Usual duration times are from 2 hours to 48 hours. After the treatment with the salt melt, the pane is cooled to room temperature. Then, the pane is cleaned, preferably with sulfuric acid ($H_2SO_4$).

The production of the composite glass by lamination is done with customary methods known per se to the person skilled in the art, for example, autoclave methods, vacuum bag methods, vacuum ring methods, calender methods, vacuum laminators, or combinations thereof. The bonding of the outer pane and the inner pane is customarily done under the action of heat, vacuum, and/or pressure.

Then, the windshield and the projector are arranged relative to one another, typically by installation of the windshield and the projector in the vehicle body. Thus, the projection arrangement according to the invention is created.

The projection arrangement according to the invention is preferably used in a vehicle as a head-up display (HUD), particularly preferably in a motor vehicle, most particularly preferably in an automobile.

The invention moreover includes the use of a vehicle windshield, comprising an outer pane and an inner pane, which are bonded to one another via a thermoplastic intermediate layer, wherein the thickness of the thermoplastic intermediate layer is variable in the vertical course with a wedge angle less than or equal to 0.3 mrad, which has an area, in which the vertical radius of curvature is at least 6 m, in a projection arrangement for a head-up display with a projection distance of at least 5 m, wherein the HUD region of the windshield is arranged completely within said region with the vertical radius of curvature of at least 6 m.

In the following, the invention is explained in detail with reference to drawings and exemplary embodiments. The drawings are schematic representations and are not true to scale. The drawings in no way restrict the invention.

Figure 2:
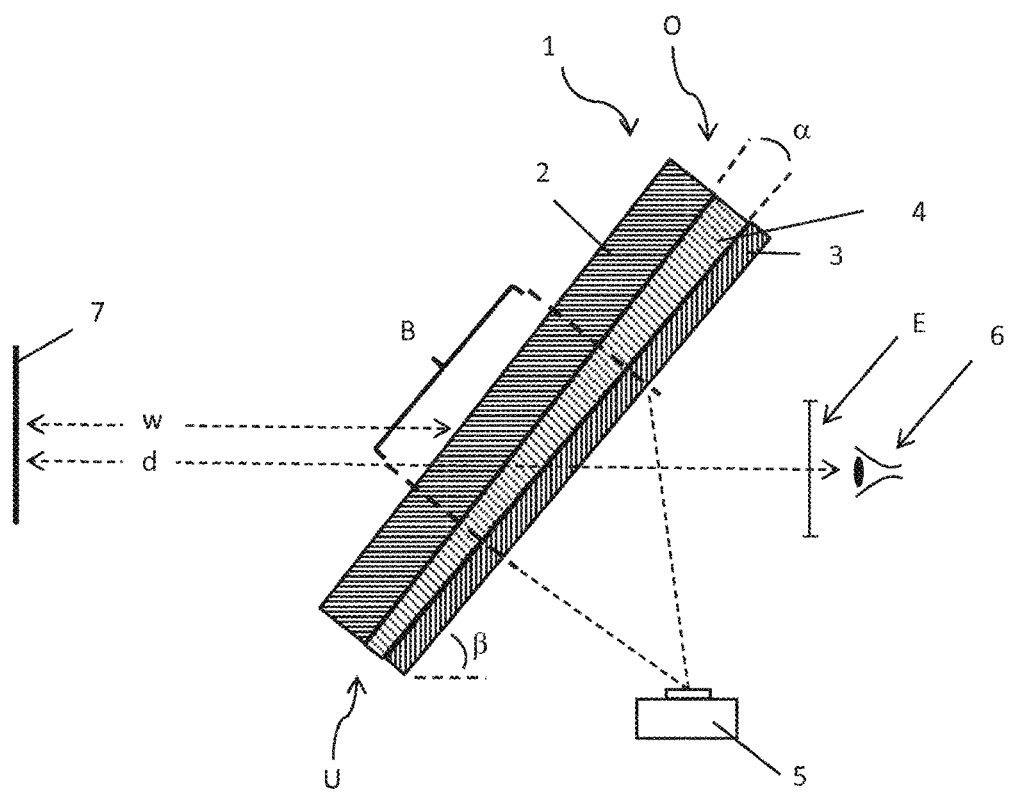
Figure 3:
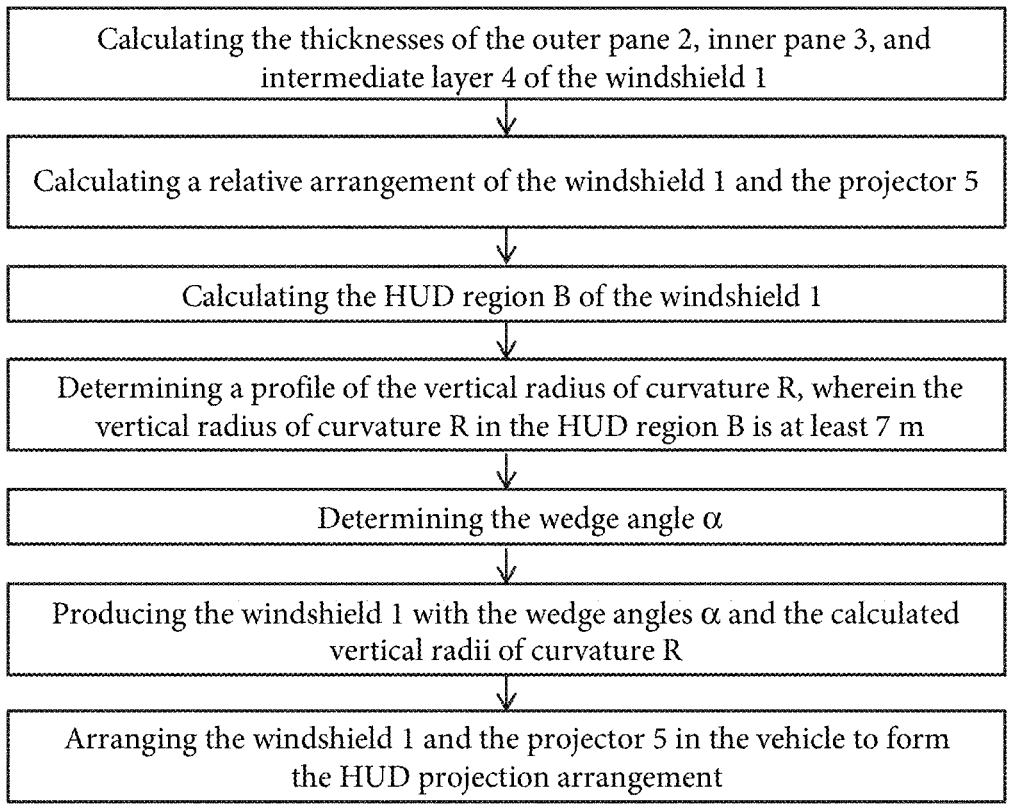

They depict:

FIG. 1 a plan view of the windshield of a projection arrangement according to the invention, FIG. 2 a cross-section through a projection arrangement according to the invention, and FIG. 3 a flowchart of an embodiment of the method according to the invention.

FIG. 1 depicts a plan view of a windshield 1 of a projection arrangement according to the invention. The windshield 1 has an upper edge O, a lower edge U, and two side edges connecting them. The upper edge O points upward, in the installation position, toward the vehicle roof (roof edge); the lower edge U, downward toward the engine compartment (engine edge). The windshield 1 has an HUD region B, which, in the installation position, can be irradiated by the HUD projector and is irradiated during operation.

FIG. 2 depicts a cross-section through a projection arrangement according to the invention, comprising the windshield 1 of FIG. 1 as well as an HUD projector 5. The windshield 1 is cut by the section line A-A'. The windshield 1 comprises an outer pane 2 and an inner pane 3, which are bonded to one another via a thermoplastic intermediate layer 4. The windshield 1 separates the vehicle interior from the outside environment, wherein, in the installation position, the outer pane 2 faces the outside environment; the inner pane 3, the vehicle interior. The installation angle β relative to the horizontal is, for example, 65°.

The outer pane 2 and the inner pane 3 are made, for example, of non-tempered soda lime glass. The outer pane 2 has, for example, a thickness of 2.1 mm; and the inner pane 3, a thickness of 1.6 mm. These panes are customary for windshields. The thickness of the intermediate layer 4 increases continuously in the vertical course from the lower edge U to the upper edge O with a substantially constant wedge angle α between the two surfaces. The intermediate layer 4 is formed from a single film made of PVB. The thickness of the intermediate layer 4 at the upper edge O is, for example, 1.0 mm and at the lower edge U, for example, 0.76 mm. By means of the wedge-shaped implementation of the intermediate layer 4, the two images that are produced by reflection of the projector image on the two surfaces of the outer pane 2 and of the inner pane 3 turned away from the intermediate layer 4 coincide with one another. Consequently, disruptive ghost images occur to a lesser extent.

The projector 5 is aimed at the HUD region B. Images are to be produced in this region by the projector 5. The projector image is reflected in the direction of the observer 6 (vehicle driver) by the windshield 1. Thus, the virtual image 7 is produced, which the observer 6 situated in the vehicle perceives behind the windshield of 1 from his point of view. The distance between the observer 6 and the virtual image 7 is referred to as the projection distance d. The distance between the windshield 1 and the virtual image 7 is referred to as the image width w.

The projection arrangement according to the invention is a so-called contact analog HUD or augmented reality HUD, which is characterized by a large projection distance d of, for example, 10 m. This enables inclusion of the environment in the optical presentation, by which means, for example, the traffic lane to be selected can be projected apparently directly on the roadway as a navigation instruction for the observer 6. In addition to the larger projection distance d, the contact analog HUD also differs from the conventional HUD by a larger HUD region B, whose area is, for example, 9% of the area of the windshield 1.

The region, within which the eyes of the observer 6 must be situated in order to perceive the virtual image, is referred to as the eyebox window. The eyebox window is vertically adjustable by mirrors in the projector 5 in order to be able to adapt the HUD to observers 6 of different body size and sitting position. The entire accessible region within which the eyebox window can be shifted is referred to as the eyebox E.

The windshield 1 has, within the HUD region B, vertical radii of curvature R of at least 6 m, for example, in the range from 8 m to 9 m. The inventors discovered that the large projection distance d in connection with the large radii of curvature R in the HUD region B makes only a very small wedge angle α necessary to prevent ghost images. The wedge angle α is, for example, 0.27 mrad. Such a small wedge angle α can be produced by stretching in a conventional PVB film with a substantially constant thickness of, for example, 0.76 mm. The production of the windshield 1 is thus substantially simplified and designed more economically than with the use of a wedge film produced by extrusion.

Even smaller wedge angles α can be obtained, for example, by an even greater projection distance d or by the use of thinner glass for the outer pane 2 and/or the inner pane 3. In an alternative embodiment, the outer pane 2 and the inner pane 3 are made of thin glass and have, for example, thicknesses of 1.6 mm for the outer pane 2 and 0.7 mm for the inner pane 3.

FIG. 3 depicts a flowchart of an exemplary embodiment of a method according to the invention for producing a projection arrangement for a head-up display. From the design data (CAD) of the vehicle, the thicknesses of the outer pane 2, the inner pane 3, and the intermediate layer 4 as well as the relative arrangement of the windshield 1 and projector 5 are calculated. The relative arrangement also yields, in addition to the angle of incidence, the HUD region B of the windshield 1, which corresponds to the irradiated or irradiatable region. When the HUD region B is calculated, the curvature profile of the pane is also defined. According to the invention, only vertical radii of curvature R of at least 6 m may occur in the HUD region B. The vertical radii of curvature R of the rest of the pane as well as the horizontal radii of curvature can be freely selected and are, usually, specified by the vehicle manufacturer (vehicle design). Next, the theoretically anticipated ghost image is calculated and the wedge angle α of the intermediate layer 4 is determined such that the primary image and the ghost image coincide. The design of the windshield 1 is thus established and it is produced with the calculated values for the vertical radii of curvature R as well as the wedge angle α using methods customary in the art. The small wedge angles α according to the invention can be achieved particularly advantageously by stretching a standard film. Then, the windshield windshield 1 and the projector 5 are arranged relative to one another, creating the projection arrangement. This typically occurs by means of installation of the windshield 1 and projector 5 in the vehicle body.

EXAMPLES

The following table contains results of simulations. For different thicknesses of the outer pane 2 and the inner pane 3, different projection distances d, and different minimum vertical radii of curvature R in the HUD region B, the wedge angles α that are necessary for avoiding ghost images were calculated. The relative arrangement of the windshield 1 and projector 5 were assumed to be constant in all examples.

| Thickness (2):(3)/mm | d/m | Minimum R/m | Installation angle β/° | Wedge angle α/mrad |
|---|---|---|---|---|
| 2.1:2.1 | 10 | 6 | 62.44 | 0.30 |
| 2.1:1.6 | 10 | 6 | 62.44 | 0.27 |
| 1.8:1.4 | 10 | 6 | 62.44 | 0.24 |
| 1.6:1.2 | 10 | 6 | 62.44 | 0.21 |
| 1.6:0.7 | 10 | 6 | 62.44 | 0.18 |
| 2.1:2.1 | 10 | 9.6 | 62.2 | 0.19 |
| 2.1:1.6 | 10 | 9.6 | 62.2 | 0.17 |
| 1.8:1.4 | 10 | 9.6 | 62.2 | 0.15 |
| 1.6:1.2 | 10 | 9.6 | 62.2 | 0.13 |
| 1.6:0.7 | 10 | 9.6 | 62.2 | 0.11 |
| 2.1:2.1 | 13 | 6 | 62.44 | 0.23 |
| 1.8:1.4 | 13 | 6 | 62.44 | 0.17 |
| Comparative Examples | | | | |
| 2.1:2.1 | 4 | 6 | 62.44 | 0.43 |
| 1.8:1.4 | 4 | 6 | 62.44 | 0.35 |
| 2.1:2.1 | 4 | 9.6 | 62.2 | 0.45 |
| 1.8:1.4 | 4 | 9.6 | 62.2 | 0.36 |

In the examples according to the invention of the first 12 rows (with the radii of curvature R according to the invention and the projection distances d according to the invention), wedge angles α according to the invention less than 0.3 mrad occur. The fact that with contact analog HUDs, such small wedge angles α can be obtained by suitable adjustment of the radii of curvature of the windshield, was unexpected and surprising for the person skilled in the art.

The last four rows describe comparative examples in which the projection distance is shortened to less than 5 m. There, wedge angles greater than 0.3 mrad occur.

LIST OF REFERENCE CHARACTERS (1) windshield
(2) outer pane
(3) inner pane
(4) thermoplastic intermediate layer
(5) projector
(6) observer/vehicle driver
(7) virtual image
(O) upper edge of the windshield 1
(U) lower edge of the windshield 1
(B) HUD region of the windshield 1
α wedge angle of the intermediate layer 4
β installation angle of 1 relative to the horizontal
R vertical radius of curvature of the windshield 1
d projection distance/distance between 6 and 7
w image width/distance between 1 and 7
(E) eyebox
A-A' vertical section line

The invention claimed is:

1. A projection arrangement for a head-up display (HUD), comprising:

i) a vehicle windshield, comprising an outer pane and an inner pane that are bonded to one another via a thermoplastic intermediate layer, the vehicle windshield having an upper edge and a lower edge and a HUD region,
wherein a thickness of the thermoplastic intermediate layer in a vertical course between the upper edge and the lower edge is variable at least in the HUD region according to a wedge angle α, and
wherein the vehicle windshield has an installation angle in the range from 55° to 75°, and wherein each of the outer pane and the inner pane have a respective thickness of a maximum of 5 mm; and ii) a projector aimed at the HUD region that is configured to generate a virtual image perceivable by an observer at a projection distance d of at least 5 m,
wherein the windshield has in the HUD region a vertical radius of curvature R of at least 6 m,
wherein a maximum value of the wedge angle α is less than or equal to 0.3 mrad,
wherein the wedge angle α is non-linearly variable from the lower edge to the upper edge,
wherein the intermediate layer is formed by at least one thermoplastic film, in which the wedge angle α is generated by stretching, and
wherein the thickness of the intermediate layer is variable in horizontal sections parallel to the upper edge and the lower edge of the vehicle windshield.

2. The projection arrangement according to claim 1, wherein the maximum value of the wedge angle α is less than or equal to 0.2 mrad.

3. The projection arrangement according to claim 1, wherein the maximum value of the wedge angle α is less than or equal to 0.1 mrad.

4. The projection arrangement according to claim 1, wherein a value of the vertical radius of curvature R in the HUD region is in a range of 6 m to 10 m.

5. The projection arrangement according to claim 1, wherein a value of the vertical radius of curvature R in the HUD region is at least 7 m.

6. The projection arrangement according to claim 5, wherein a value of the vertical radius of curvature R in the HUD region is in a range of 7 m to 9 m.

7. The projection arrangement according to claim 1, wherein the outer pane and the inner pane have a respective thickness of at most 2.6 mm.

8. The projection arrangement according to claim 1, wherein the outer pane and the inner pane have a respective thickness of at most 2.1 mm.

9. The projection arrangement according to claim 7, wherein the inner pane has a thickness less than 1.2 mm and the outer pane has a thickness less than 2.1 mm.

10. The projection arrangement according to claim 7, wherein the thickness of the inner pane is preferably from 0.3 mm to 1.1 mm, and wherein the thickness of the outer pane is preferably from 1.2 mm to 2.0 mm.

11. The projection arrangement according to claim 7, wherein the thickness of the inner pane is from 0.6 mm to 0.8 mm, and wherein the thickness of the outer pane is from 1.4 mm to 1.8 mm.

12. The projection arrangement according to claim 9, wherein the inner pane is a chemically tempered pane.

13. The projection arrangement according to claim 1, wherein the intermediate layer has a minimum thickness from 0.2 mm to 2 mm.

14. The projection arrangement according to claim 1, wherein the intermediate layer has a minimum thickness from 0.5 mm to 0.9 mm.

15. The projection arrangement according to claim 1, wherein the intermediate layer contains at least one of: a) polyvinyl butyral (PVB), b) ethylene vinyl acetate (EVA), c) polyurethane (PU), and d) mixtures or copolymers or derivatives of a), b) or c).

16. The projection arrangement according to claim 1, wherein the outer pane contains soda lime glass, and wherein the inner pane contains soda lime glass or aluminosilicate glass.

17. The projection arrangement according to claim 1, wherein the intermediate layer is implemented as a noise-damping, multilayer film.

18. A method for producing a projection arrangement for a head-up display (HUD), the projection arrangement comprising:
   i) a vehicle windshield, including an outer pane and an inner pane that are bonded to one another via a thermoplastic intermediate layer, the vehicle windshield having an upper edge and a lower edge and a HUD region,
      wherein a thickness of the thermoplastic intermediate layer in a vertical course between the upper edge and the lower edge is variable at least in the HUD region according to a wedge angle $\alpha$ that is less than or equal to 0.3 mrad; and
   ii) a projector aimed at the HUD region that is configured to generate a virtual image with a projection distance d of at least 5 m;
   wherein the method comprises:
      (a) Calculating the HUD region of the windshield;
      (b) Creating a profile of the vertical radius of curvature R so that the vertical radius of curvature R in the HUD region is at least 6 m;
      (c) Producing the windshield having the wedge angle $\alpha$ and the vertical radius of curvature R according to the created profile; and
      (d) arranging the windshield and the projector relative to one another so to create the projection arrangement,
         wherein the thermoplastic intermediate layer comprises a thermoplastic film, and wherein the wedge angle $\alpha$ is introduced into the thermoplastic film by stretching, and
         wherein the thickness of the intermediate layer is variable in horizontal sections parallel to the upper edge and the lower edge of the vehicle windshield.

19. A method for using a vehicle windshield, the vehicle windshield comprising:
   an outer pane and an inner pane that are bonded to one another via a thermoplastic intermediate layer,
   wherein a thickness of the thermoplastic intermediate layer in a vertical course of the vehicle windshield is variable according to a wedge angle $\alpha$ that is less than or equal to 0.3 mrad,
   wherein the vehicle windshield has a region with a vertical radius of curvature R of at least 6 m, and
   wherein the method comprises using the vehicle windshield in a projection arrangement for a head-up display with a projection distance d of at least 5 m, wherein the HUD region of the windshield is arranged completely inside said region with the vertical radius of curvature R of at least 6 m.

* * * * *